United States Patent [19]
Karlsson

[11] Patent Number: 6,016,262
[45] Date of Patent: Jan. 18, 2000

[54] CONVERTER EQUIPMENT

[75] Inventor: Bert Karlsson, Västerås, Sweden

[73] Assignee: DaimlerChrysler AG, Stuttgart, Germany

[21] Appl. No.: 09/101,319

[22] PCT Filed: Jan. 22, 1997

[86] PCT No.: PCT/SE97/00106

§ 371 Date: Sep. 3, 1998

§ 102(e) Date: Sep. 3, 1998

[87] PCT Pub. No.: WO97/27664

PCT Pub. Date: Jul. 31, 1997

[30] Foreign Application Priority Data

Jan. 23, 1996 [SE] Sweden .................................. 9600232

[51] Int. Cl.[7] .......................... H02M 7/00; H02M 3/337
[52] U.S. Cl. ................................................ 363/67; 307/17
[58] Field of Search ................................. 363/65, 67, 68, 363/69, 70, 71; 307/17

[56] References Cited

U.S. PATENT DOCUMENTS 4,939,381  7/1990  Shibata et al. ............................ 307/17
5,142,468  8/1992  Nerem ....................................... 363/71

OTHER PUBLICATIONS

K. Heumann, C. Stumpe, Thyristoren, 2:e auflage, 1970, Teubner Stuttgart, (No month) "Netzgeführter Umrichter" pp. 116–121, especially pp. 118–119, Fig. 118.2a.

*Primary Examiner*—Y. J. Han
*Attorney, Agent, or Firm*—Pollock, Vande Sande & Amernick

[57] ABSTRACT

Converter equipment has two double converters (SR1, SR2), the ac terminals of which are connected to separate secondary windings (T11, T12) of a transformer (T1) and the dc terminals of which are connected to separate direct-voltage networks (LN1, LN2). Each double converter has a rectifier bridge (LR1, LR2) and an inverter bridge (VR1, VR2). Each secondary winding is connected to an inverter bridge in one double converter and to a rectifier bridge in the other double converter.

10 Claims, 3 Drawing Sheets

CONVERTER EQUIPMENT

TECHNICAL FIELD

The present invention relates to converter equipment with a number of double converters, in which the ac terminals of each double converter are arranged for connection to a first alternating-voltage network via first transformer equipment and its dc terminals are arranged for connection to a direct-voltage network, and wherein each double converter has a first converter adapted to operate in a certain direction of the direct current of the double converter and a second converter adapted to operate in the opposite direction of the direct current.

BACKGROUND ART

It is known to use so-called double converters for transmission of electric power between an alternating-voltage network and the direct-voltage side of the converter. Such a converter usually comprises two line-commutated controllable converters, for example three-phase thyristor bridges, which are antiparallel-connected on their dc side and which have their ac terminals connected to an alternating-voltage network. In a double converter, only one of the two converters at a time is operating. A double converter can transmit power in an arbitrary direction between its ac side and its dc side and do this at an arbitrary polarity of the direct voltage or of the direct current.

In double converters, large circulating short-circuit currents may arise if, by mistake, valves in both the converters become conducting simultaneously. These currents may cause serious damage to the equipment before any overvoltage protection device and circuit breaker on the ac side have time to react. It has therefore been necessary hitherto to provide double converters with fuses or with impedance elements such as inductors or resistors. These measures have obvious disadvantages in the form of, for example, increased complexity, increased manufacturing cost, reduced reliability in operation, and increase of voltage drops and power losses.

The direct-voltage network connected to the direct-voltage side of a double converter may be of different kinds. It may consist of one single load object, for example a dc motor, or of a group of dc motors. It may consist of a direct-voltage network, to which a plurality of load objects are connected or may be connected. An example of such an application is a railway catenary supply system intended to supply direct-voltage vehicles. According to a further alternative, the double converter may form part of a frequency converter with a direct-voltage intermediate link, for example a catenary supply system intended to supply ac vehicles.

In several of these applications, the direct voltage on the direct-voltage side of a double converter has a constant polarity (and often also approximately constant magnitude). One of the two converters of a double converter will then only operate as a rectifier and the other converter only as an inverter, and which of the converters is active at a certain time is determined by the currently prevailing direction of the power flow between the alternating-voltage network and the direct-voltage network.

SUMMARY OF THE INVENTION

The invention aims to provide converter equipment of the kind mentioned in the introductory part of the description, in which, in a simple and advantageous manner, the risk of the above-mentioned circulating short-circuit currents is eliminated, whereby fuses or current-limiting impedance elements may be completely dispensed with and the disadvantages thereof be avoided. The invention also aims to provide, at the same time, equipment which has a low consumption of reactive power, which exhibits a low effect on the network in the form of harmonic currents and which can be designed in a simple manner for high powers.

What characterizes equipment according to the invention will become clear from the appended claims.

BRIEF DESCRIPTION OF THE DRAWINGS

The invention will be explained in greater detail in the following with reference to the accompanying FIGS. 1–3.

DESCRIPTION OF THE PREFERRED EMBODIMENTS

Figure 1:
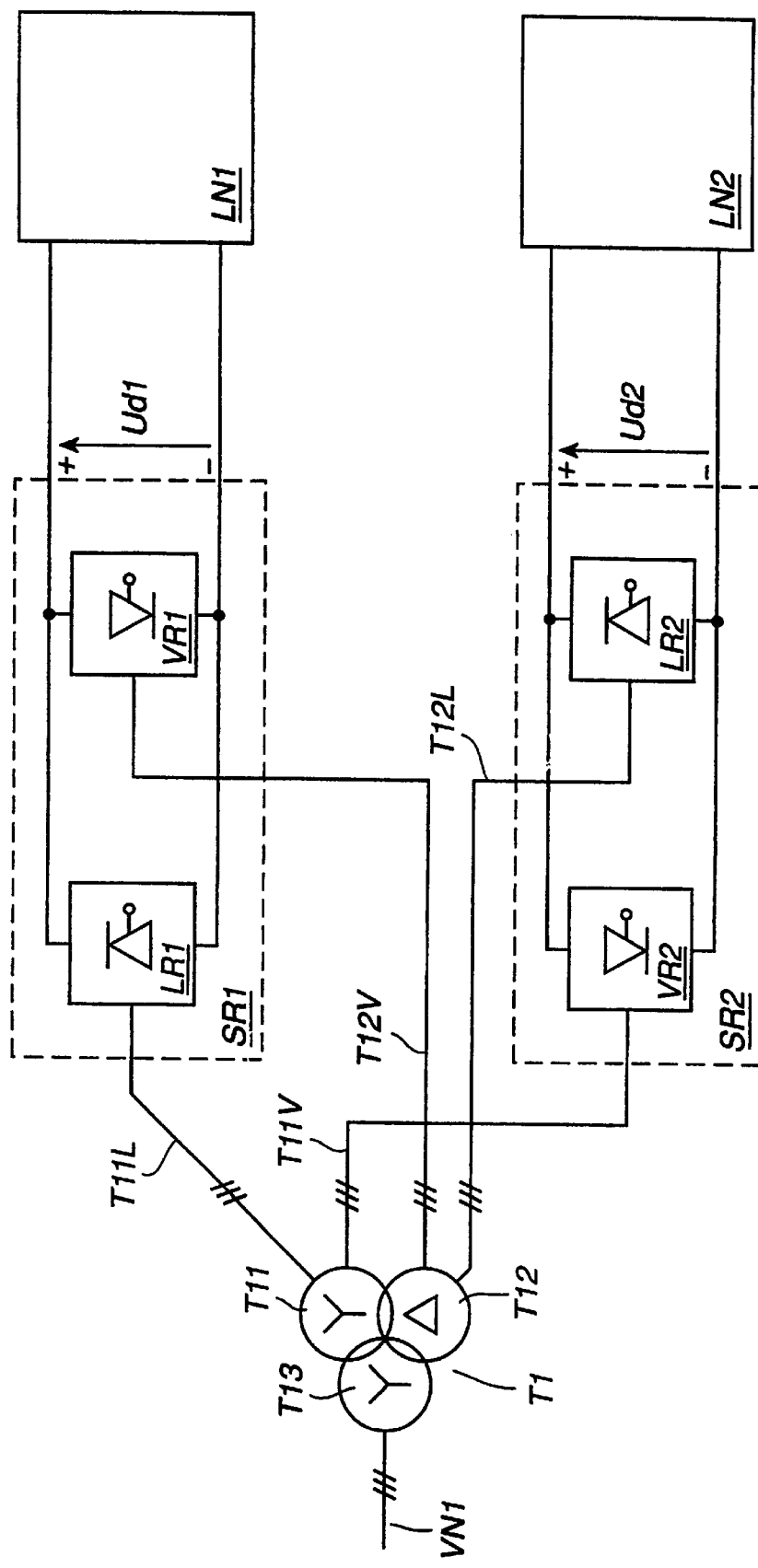
FIG. 1 shows the principle of converter equipment according to the invention.

FIG. 1 shows an example of converter equipment according to the invention. It has two double converters, SR1 and SR2. The double converter SR1 comprises two controllable converters LR1 and VR1, connected in antiparallel with each other on their dc sides, in the form of three-phase phase-angle-controlled line-commutated thyristor bridges. The dc terminals of the bridges are connected to a direct-voltage network LN1 with a direct voltage Ud1 which has a constant polarity. In the same way, the double converter SR2 consists of two three-phase phase-angle-controlled line-commutated thyristor converters LR2 and VR2, connected in antiparallel with each other on their dc sides, the dc terminals of which are connected to a direct-voltage network LN2 with a direct voltage Ud2 with constant polarity.

The double converters are connected, via a transformer T1, to an alternating-voltage network VN1 which is a three-phase electricity supply network. The transformer has a Y-connected winding T13, which is connected to the network VN1, and two secondary windings, which are galvanically separated from each other, namely, the winding T11 with a Y connection and the winding T12 with an extended Δ connection.

In a known manner, the double converters may be used for power transmission in an arbitrary direction between, on the one hand, the direct-voltage networks LN1 and LN2, and, on the other hand, the electricity supply network VN1. At a power direction from the alternating-voltage network to the direct-voltage network LN1, the bridge LR1 will operate in rectifier operation, whereas the bridge VR1 is blocked and inactive. In case of the opposite power direction, the bridge VR1 operates in inverter operation, and the bridge LR1 is then blocked. In the same way, the bridge LR2 operates as a rectifier and the bridge VR2 as an inverter in case of power transmission between the alternating-voltage network VN1 and the direct-voltage network LN2.

Each one of the secondary windings of the transformer T1 has two three-phase terminals, one "rectifier terminal" for a lower voltage and one "inverter terminal" for a higher voltage. The lower voltage is adapted for the two rectifier bridges in such a way that, at normal voltage in the alternating-voltage and direct-voltage networks, they operate controlled to near their maximum direct voltage, that is, with a minimum of reactive power consumption. The higher voltage is adapted for the two inverter bridges, for which, when they are operating controlled to their maximum direct voltage, the ratio between alternating and direct voltage in a known manner is higher than for the rectifier bridges. The low secondary winding T11 has its rectifier terminal connected to the rectifier bridge LR1 in the double converter SR1 via the line T11L and its inverter terminal connected to the inverter bridge VR2 in the double converter SR2 via the line T11V. The secondary winding T12 has its rectifier terminal connected to the rectifier bridge LR2 in the double converter SR2 via the line T12L and its inverter terminal connected to the inverter bridge VR1 in the double converter SR1 via the line T12V.

Figure 2:
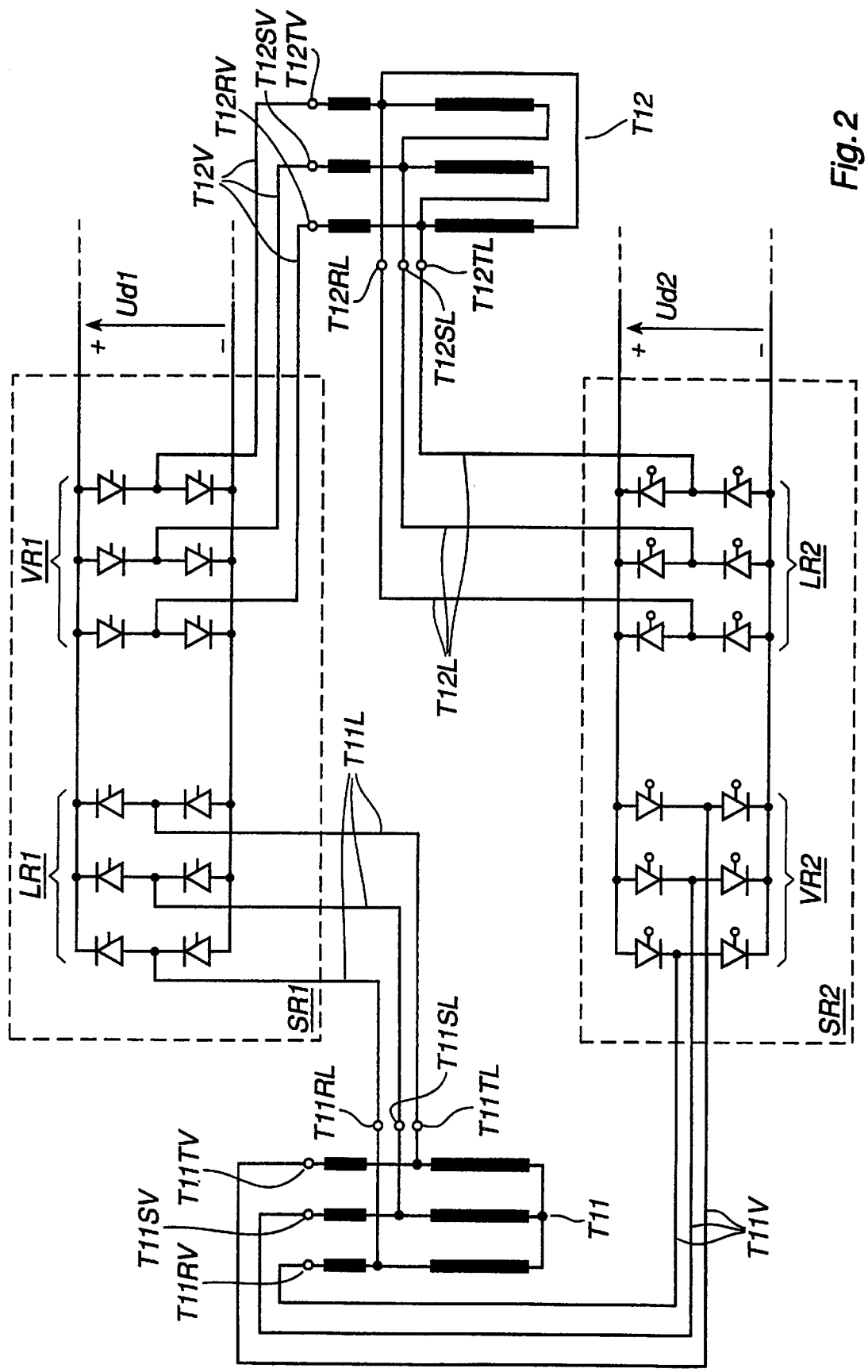
FIG. 2 shows in more detail the main circuits of the equipment.

FIG. 2 shows in more detail the secondary windings T11 and T12 and their connection to the converters. Each phase winding of the secondary winding T11 has two terminals, T11RV and T11RL, T11SV and T11SL, and T11TV and T11TL. One terminal, for example T11RL, of a phase winding is arranged at an alternating voltage which, when the rectifier bridge LR1 is controlled to its maximum direct voltage, corresponds to the desired direct voltage of the direct-voltage side of the bridge. The other terminal—T11RV—of the phase winding provides an alternating voltage which, when the inverter bridge VR2 is controlled to its maximum direct voltage, corresponds to the same direct voltage, that is, an alternating voltage which typically is of the order of magnitude of 10% higher than the voltage of the terminal T11RL.

The phase windings and the terminals—T12RV and T12RL, T12SV and T12SL, and T12TV and T12TL—of the secondary winding T12 designed with an extended Δ connection are so arranged that alternating voltages of the same magnitude are obtained from the terminals of this secondary winding as from the terminals of the winding T11. The voltages from the winding T12 will have a 30° phase shift in relation to the corresponding voltages from the winding T11, which means that the six-pulse converter bridges in the double converters will have a 12-pulse effect on the network, that is, the mains current will have a greatly reduced harmonic content.

The pieces of control equipment of the two double converters may be of completely conventional kind and are therefore not shown in the figures.

A misfiring which renders valves in the two bridges of a double converter conducting simultaneously cannot, in the connection described above, cause any short-circuit currents since the bridges are connected to separate secondary windings and have separate direct-voltage networks. The risk of these short-circuit currents, which generally exists in double converters, is completely eliminated. In this way, the need of fuses or current-limiting impedance elements is completely eliminated, which makes the equipment simpler and less expensive and provides increased reliability as well as reduced losses.

The embodiment of the transformer windings described above, with different transformer terminals for the rectifier and inverter bridges, permits these both in rectifier operation and in inverter operation to operate controlled to as near their maximum direct voltage as possible, which entails a minimum reactive-power consumption of the equipment. This is especially important in those normally occurring cases where the converters for the major part of the time operate in rectifier operation and where—if the bridges were connected to the same alternating voltage—the rectifier bridges would operate controlled to a lower direct voltage than the maximally possible one and hence with a continuously high reactive-power consumption.

Further, because of the two secondary windings of the network-side transformer which are designed with separate connections, equipment according to the invention has a low harmonic content in the mains current, which, especially in weak power networks, is an important advantage and which considerably lowers the costs of any harmonic filters.

As will be clear from the description above, that section of the winding which is disposed between the two terminals (e.g. between terminals T11RV and T11RL) of a phase winding is currentless during inverter operation, and it will only be loaded during inverter operation. In many ordinary applications, for example when the equipment is included in a motor drive system, the rectifier operation is completely predominant, and inverter operation occurs only for short intervals, and then often with a lower maximum current than the maximum current during rectifier operation. The thermal load on the above-mentioned winding section thus becomes low. Since the risk of the above-mentioned short-circuit currents is completely eliminated, the short-circuit forces exerted by these currents on the windings need not be taken into consideration when dimensioning the winding. The winding section, which is loaded during inverter operation only, can therefore be given a considerably weaker dimensioning than the rest of the winding, which is advantageous from the cost point of view.

In converter equipment for high powers, it is often necessary or advantageous for other reasons to use two or more parallel-operating converters. In such equipment, the invention offers special advantages since the division into two parallel-operating double converters does not entail any increased number of converters. The considerable advantages of the invention are then obtained at the cost of the insignificant additional cost of the additional transformer terminals.

Figure 3:
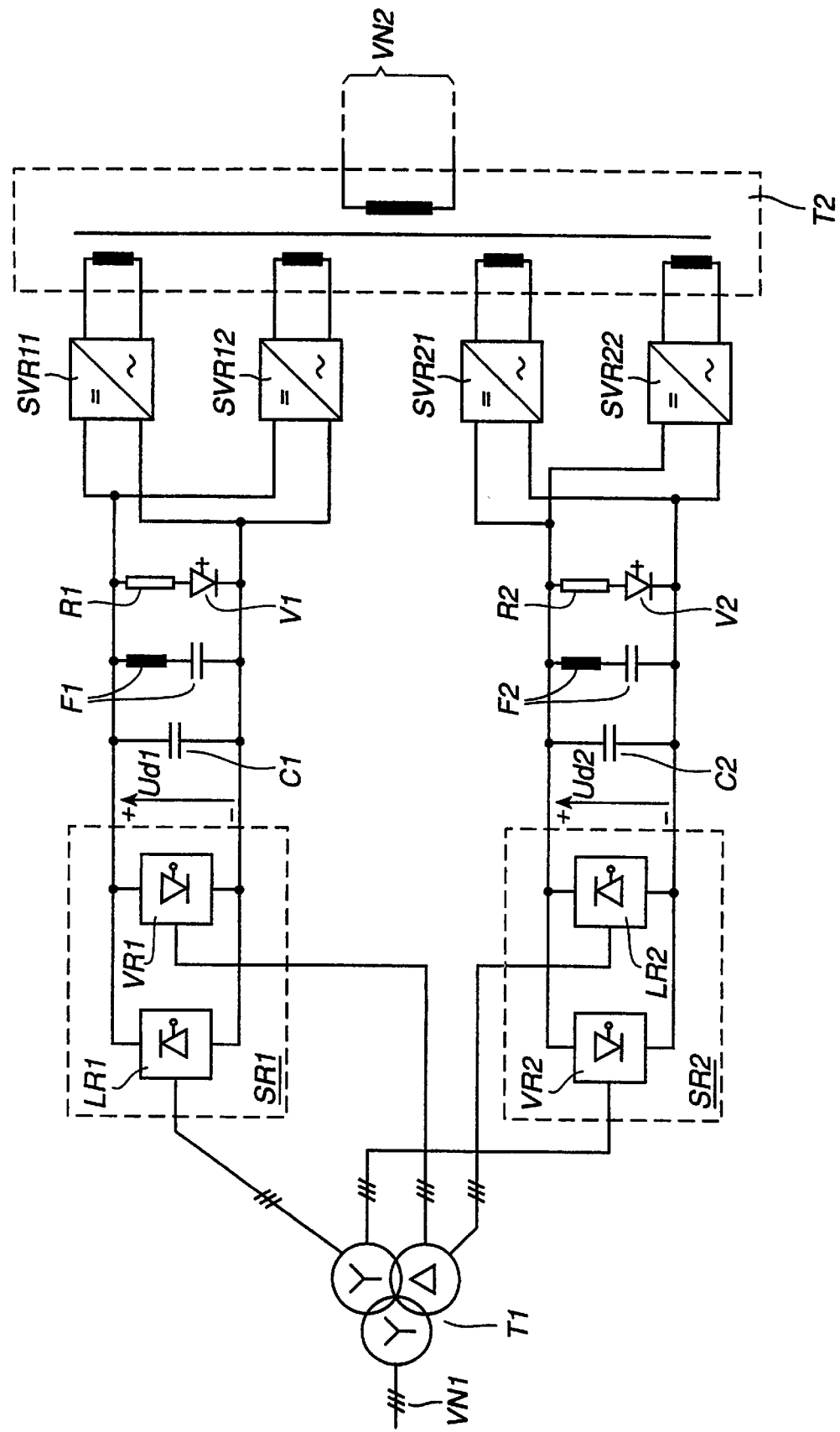
FIG. 3 shows frequency converter equipment according to the invention.

FIG. 3 shows an example of a frequency converter for power supply of the catenary designed according to the invention. The two double converters SR1 and SR2 are connected to the power network VN1 via the transformer T1 in the manner described above. Each double converter is connected, via a direct-voltage intermediate link with a constant polarity and a substantially constant voltage, to two (or alternatively more) self-commutated single-phase inverters SVR11, SVR12 and SVR21, SVR22, respectively. The inverters generate square voltages with, for example, the frequency 16⅔ Hz. All the inverters are connected to separate primary windings of a single-phase transformer T2, the secondary winding of which is connected to the overhead catenary network VN2. The alternating voltages of the inverters will thus be added, and they are suitably controlled in a manner known per se with such pulse lengths and with phase shifts which are adapted such that a good curve shape is obtained in the voltage of the secondary winding.

The direct-voltage intermediate link connected to the converter SR1 has a capacitor C1, serving as a voltage-equalizing energy magazine, and a schematically shown harmonic filter F1. Further, the intermediate link has a resistor R1, which is connectible with the aid of a controllable semiconductor valve V1 and with the aid of which, if necessary, an impermissible voltage rise in the intermediate link in certain operating cases can be prevented.

The direct-voltage intermediate link C2, F2, V2, R2, connected to the converter SR2, is identical with the intermediate link described in the preceding paragraph.

Traction supply systems are generally designed for high powers and thus constitute examples of converter equipment where the invention offers special advantages.

The embodiments of equipment according to the invention described above are only examples, and other embodiments are feasible within the scope of the invention. Thus, the invention may be applied to converter equipment of other kinds than the traction supply converter described above.

The network-side transformer equipment of the double converter has been described above as comprising one single transformer with one Y-connected and one Δ-connected secondary winding, but this transformer may also be designed with other types of connection than those described above. Likewise, the common network-side transformer may be replaced, if desired, by a separate network-side transformer for each double converter.

Further, the invention has been described above with reference to equipment where both direct-voltage networks have constant polarity of the direct voltage, that is, equipment where in each double converter a certain converter is operating in inverter operation only and the other converter in rectifier operation only. The advantages of the invention become particularly prominent in such equipment, but the invention may also be advantageously applied to such equipment where the direct voltages may change polarity. In the latter type of equipment, a certain converter may, in principle, operate both in inverter operation and in rectifier operation. The secondary windings of the network-side transformer of the double converters may then be simplified by omitting the double terminals and the two converters which are connected to a certain secondary winding are connected to the same winding terminal.

What is claimed is:

1. Converter equipment with a number of double converters (SR1, SR2), in which ac terminals of each double converter are arranged for connection to a first alternating-voltage network (VN1) via first transformer equipment (T1), which has two separate secondary windings, namely, a first (T11) and a second (T12) secondary winding, and dc terminals of said each double converter are arranged for connection to a direct-voltage network (LN1, LN2), and wherein each double converter has a first converter (VR1, VR2) adapted to operate at a certain direction of the direct current of the double converter and a second converter (LR1, LR2) adapted to operate at an opposite direction of the direct current, characterized in that the converter equipment comprises a first and a second double converter (SR1, SR2), which are connected to different direct-voltage networks (LN1, LN2) and adapted to operate with mutually identical power directions, the first secondary winding (T11) is connected to the first converter (VR1) of the first double converter (SR1) and to the second converter (LR2) of the second double converter (SR2), the second secondary winding (T12) is connected to the first converter (VR2) of the second double converter (SR2) and to the second converter (LR1) of the first double converter (SR1).

2. Converter equipment according to claim 1, characterized in that the direct-voltage networks (LN1, LN2) connected to the first and second double converters (SR1, SR2) are adapted to operate with a constant polarity of the direct voltage.

3. Converter equipment according to claim 2, characterized in that each secondary winding has first terminals (T11RV, T11SV, T11TV) for a higher alternating voltage and second terminals (T11RL, T11SL, T11TL) for a lower alternating voltage, the first terminals (T11RV, T11SV, T11TV) of the first secondary winding (T11) are connected to the first converter (VR1) of the first double converter (SR1), the second terminals (T11RL, T11SL, T11TL) of the first secondary winding (T11) are connected to the second converter (LR2) of the second double converter (SR2), the first terminals (T12RV, T12SV, T12TV) of the second secondary winding (T12) are connected to the first converter (VR2) of the second double converter (SR2), and the second terminals (T12RL, T12SL, T12TL) of the second secondary winding (T12) are connected to the second converter (LR1) of the first double converter (SR1).

4. Converter equipment according to claim 3, characterized in that in each secondary winding (T11) of the first transformer equipment (T1), that part of the winding which is disposed between the two terminals (T11RV, T11SV, T11TV and T11RL, T11SL, T11TL, respectively) of the secondary winding is dimensioned for a lower load than the other part of the winding.

5. Converter equipment according to claim 1, characterized in that the two secondary windings (T11, T12) of the first transformer equipment are galvanically separated from each other.

6. Converter equipment according to claim 1, characterized in that the two converters (LR1, VR1) of said each double converter consist of controllable converters.

7. Converter equipment according to claim 6, characterized in that the two converters of said each double converter (e.g. SR1) consist of phase-angle-controlled line-commutated converters.

8. Converter equipment according to claim 1, characterized in that the first transformer equipment (T1) consists of one single transformer with a first and a second secondary winding (T11, T12), which are designed with special modes of connection for reduction of the effect on the network exerted by the equipment.

9. Converter equipment according to claim 8, characterized in that one of the secondary windings (T11) is Y-connected and the other secondary winding (T12) is designed with an extended Δ connection.

10. Converter equipment according to claim 1, characterized in that the direct-voltage side of the first double converter (SR1) is connected to a first direct-voltage intermediate link (C1, F1, R1, V1) with a substantially constant voltage (Ud1), that the direct-voltage side of the second double converter (S2) is connected to a second direct-voltage intermediate link (C2, F2, R2, V2) with substantially constant voltage (Ud2), that a first group of self-commutated inverters (SVR11, SVR12) is connected to the first direct-voltage intermediate link, that a second group of self-commutated inverters (SVR21, SVR22) is connected to the second direct-voltage intermediate link, and that the ac terminals of the two inverter groups are connected to separate primary windings of second transformer equipment (T2), which has a secondary winding adapted for connection to a second alternating-voltage network (VN2).

* * * * *